United States Patent [19]
Matsumoto et al.

[11]  4,396,429
[45]  Aug. 2, 1983

[54] RECORDING LIQUID

[75] Inventors: Tokio Matsumoto, Tokyo; Seiichi Aoki, Kawasaki, both of Japan

[73] Assignee: Canon Kabushiki Kaisha, Tokyo, Japan

[21] Appl. No.: 389,554

[22] Filed: Jun. 17, 1982

[30]      Foreign Application Priority Data
   Jun. 24, 1981 [JP]   Japan .................................. 56-97922

[51] Int. Cl.$^3$ ............................................ C09D 11/02
[52] U.S. Cl. ........................................ 106/20; 106/22
[58] Field of Search .................................... 106/22, 20

[56]           References Cited
       FOREIGN PATENT DOCUMENTS
   2308678  8/1974  Fed. Rep. of Germany .
   3011235 10/1981  Fed. Rep. of Germany .

Primary Examiner—John Kight, III
Assistant Examiner—Amelia B. Yarbrough
Attorney, Agent, or Firm—Fitzpatrick, Cella, Harper & Scinto

[57]              ABSTRACT

A recording liquid comprising an aqueous liquid composition containing a water-soluble dye as recording agent is characterized in that the content of m-phenylenediamine in said composition is 1000 ppm or less.

5 Claims, No Drawings

RECORDING LIQUID

BACKGROUND OF THE INVENTION

1. Field of the Invention

This invention relates to a recording liquid excellent in thermal stability, particularly to a recording liquid (hereinafter called as "ink") which is suitable for use in the method in which recording is performed by discharging liquid droplets through a discharging outlet (orifice) by heat energy.

2. Description of the Prior Art

As inks to be generally used for writing implements such as felt pens, fountain pens, etc., solutions or dispersions of the various dyes or pigments in liquid mediums comprising water or other organic solvents are well known in the art. In the so-called ink jet recording system, wherein recording is performed by permitting the ink in a recording head to be discharged through a discharging orifice by vibration by means of a piezovibrator, electrostatic attraction by application of a high voltage or heat energy, and by the like it is also known to use those inks as mentioned above.

As an example of the general basic constitution of the ink for writing implements or ink jet recording, there may be mentioned a composition comprising as primary components the three of a water-soluble dye, water which is the solvent of said dye, and a glycol which is a drying preventing agent. As a water-soluble dye, it is preferred to use a direct dye, an acid dye or a basic dye for excellent fastness or tone. However, in many cases, these dyes contain inorganic salts such as sodium chloride, sodium sulfate, and the like, which are by-produced during synthesis of dyes or added as salting-out agents, diluting agents or levelling agents. Besides, some of these dyes are synthesized from m-phenylenediamine as starting material, and it is not possible to keep a part of the synthetic starting material away from remaining in the dye synthesized.

In the prior art, preparation of an ink by use of a dye containing such impurity has been encountered with such in-conveniences as mentioned below.

That is, most of the above impurities have been the causes for clogging of the capillaries of writing implements or of orifices of ink jet device by lowering the dissolving stability of the dyes in inks thereby to form agglomeration or precipitation of dyes. According to the knowledge of the present inventors, above all, m-phenylendiamine lowered heat stability (namely, dissolving stability at high temperatures) of an ink. In other words, in case of the ink of prior art to be used in an ink jet recording system, especially in such system as disclosed in, for example, Japanese Patent Laid-open No. 51837/1979 or German Patent Laid-open (DOLS) No. 2843064, wherein ink droplets are generated by heat energy, heating of ink will frequently cause deposition of insolubles from the ink on the surface at the heat acting portion within the ink jet head, thereby impairing the ink discharging function of the head.

SUMMARY OF THE INVENTION

The present invention has been accomplished in view of the state of the art as described above. An object of the present invention is to provide an ink which is capable of elongating to a great extent the usage life of a recording head to be applied for the ink jet recording system by heat energy simultaneously with marked enhancement of its reliability, and also enabling great decrease in chances of trouble.

Further, the other object of the present invention is to provide an ink excellent in thermal dissolving stability for a long period or a short period.

The ink according to the present invention, which can accomplish such objects as mentioned above, comprises an aqueous composition containing a water-soluble dye as recording agent, characterized in that content of m-phenylenediamine in said composition is 1000 ppm or less.

DETAILED DESCRIPTION OF THE PREFERRED EMBODIMENTS

The present inventors had a particular interest in m-phenylenediamine, which was contained on the order of about 1400–5500 ppm in commercially available dyes prepared therefrom as starting material. Inks prepared from dyes containing such high levels of m-phenylenediamine are very bad in heat stability.

As dyes prepared from m-phenylenediamine as starting material, there may be included Colour Index Direct Black 19, 22, 38 and 154.

Thus, it is desirable for enhancement of heat stability to reduce the content of m-phenylenediamine in an ink as low as possible, but, as the result, the dye itself is lowered in concentration to give a recording image insufficient in density and deficient in quality, which may also be inferior in light fastness. For this reason, it is important to employ a method in the present invention by which m-phenylenediamine can be removed selectively from an ink. However, according to the investigations made by the present inventors, it has been found that it is not required to reduce the concentration of m-phenylenediamine in an ink to zero, but reduction of the concentration of 1000 ppm or less will suffice to ensure sufficient heat stability in practice. However, only from the standpoint of improving heat stability of an ink, it is preferred that the concentration of m-phenylenediamine in an ink should be 300 ppm or less. More preferably, the concentration should be made 100 ppm or less.

It can be carried out by the methods described later to decrease the content of m-phenylenediamine in an ink to 1000 ppm or less while keeping the content of a dye in the ink within a desired range.

Whereas, the content of a water-soluble dye (e.g. direct dye, acid dye, basic dye) to be used in the ink of the present invention may generally be within the range of about 1 to 10% by weight based on the total weight of ink.

The ink of the present invention contains water as principal liquid medium component. However, rather than water alone, it is more preferred to use a mixture of water with various water-soluble organic solvents.

Water-soluble organic solvents may include, for example, alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol, isobutyl alcohol, etc.; amides such as dimethylformamide, dimethylacetamide, etc.; ketones or ketoalcohols such as acetone, diacetone alcohol, etc.; ethers such as tetrahydrofurane, dioxane, etc.; polyalkylene glycols such as polyethylene glycol, polypropylene glycol, etc.; alkylene glycols having 2 to 6 carbon atoms in alkylene moiety such as ethylene glycol, propylene glycol, butylene glycol, triethylene glycol, 1,2,6-hexane triol, thiodiglycol, hexylene glycol, diethylene glycol, etc.; glycerine; lower alkyl ethers of polyhydric alcohols such as ethylene glycol methylether, diethylene glycol methyl(or ethyl)ether, triethylene glycol mono-methyl(or ethyl)ether, etc.

Among these water-soluble organic solvents, polyhydric alcohols such as diethylene glycol or lower alkyl ethers of polyhydric alcohols such as triethylene glycol mono-methly(or ethyl)ether are particularly preferred.

The above water-soluble organic solvent may be contained in an ink generally in a amount of 10 to 70% by weight based on the total weight of the ink. While the content of water may be determined in a wide range depending on the type of solvent employed, its composition, and desired characteristics of the ink, it generally ranges from 20 to 70% by weight based on the total weight of the ink.

In addition to the above components, it is also possible to incorporate various additives well known in the art.

For example, such additives may include viscosity controllers such as polyvinyl alcohol, celluloses, water-soluble resins, etc.; various cationic, anionic or nonionic surfactants; surface tension controllers such as diethanolamine, triethanolamine, etc.; pH controllers with the use of buffers; and others.

In the present invention, the ink formulated with the components as described above is further subjected to the treatment according to the various methods as described below to remove m-phenylenediamine in the ink to a content of 1000 ppm or less.

The methods for removing m-phenylenediamine include the following:

a. The method in which an adsorbent (activated charcoal, zeolite, diatomaceous earth, etc.) is mixed with at least a dye (which may be an ink), the mixture is stirred and thereafter the adsorbent is filtered off;

b. the method in which at least a dye (which may be an ink) is passed through a column packed with an adsorbent;

c. the method in which a dye is dissolved in an appropriate solvent and m-phenylenediamine is separated by extraction from the solution, or a dye is dissolved in a solvent in which m-phenylenediamine is insoluble, followed by separation by filtration;

d. the diaphragm separation method such as the osmosis method, the reverse osmosis method, the ultrafiltration method, etc.;

e. the electrophoresis method; and f. the adsorption separation method by chromatography.

The ink of the present invention prepared according to the above procedure is excellent with well balanced properties with respect to any of recording characteristics (signal response characteristic, stability of liquid droplet formation, discharging stability, continuous recording performance for a long time, discharging stability after intermission of elongated recording), storage stability, fixing characteristic on a material to be recorded or light resistance, weathering resistance or water resistance of recorded images as well as thermal stability.

The present invention is described in further detail for illustration of its effect by referring to the following Examples.

EXAMPLE 1

On an alumina substrate, $SiO_2$ layer (lower layer) was formed by sputtering to a thickness of 5 μm, subsequently $HfB_2$ layer as heat-generating resistor layer to a thickness of 1000 Å and an aluminum as electrode to a thickness of 3000 Å. Then, by selective etching, a heat-generating resistor pattern of 50 μm × 200 μm was formed, followed by lamination of $SiO_2$ layer by sputtering as protective layer (upper layer) to a thickness of 1 μm, thus forming electricity-heat converter on the substrate. The converter was thereafter joined with a glass plate having engraved a groove of 50 μm width × 50 μm depth, so that the groove may coincide with the heat-generating resistor. Subsequently, the orifice end surface was polished, so that the distance between the tip of the heat-generating resistor and the orifice may be 250 μm, to prepare a recording head. Using this recording head, inks having the following liquid compositions were discharged out.

The numerical value shown in the liquid compositions are all parts by weight, unless otherwise noted.

| Ink A-1 | | Ink A-2 |
|---|---|---|
| Direct Black G conc. (trade name of dye; produced by Chugai Kasei Co.) [C.I.D.B. 19] | 3 | The same composition as shown in the left column |
| Diethylene glycol | 40 | |
| Polyethylene glycol #300 | 10 | |
| N—methyl-2-pyrrolidone | 12 | |
| Distilled water | 35 | |
| Untreated | | The above ink composition was subjected to ultrafiltration through a diaphragm of Yumicron YUF-10,000 (YUASA Battery Co., Ltd.) and, with supplemental distilled water corresponding to the lost amount added to the concentrate, the mixture was sufficiently stirred |
| Content of m-phenylenediamine | | |
| 2800 ppm | | 100 ppm |

| Ink B-1 | | Ink B-2 |
|---|---|---|
| Direct Fast Black B (Trade name of dye; Hodogaya Kagaku Co.) [C.I.D.B. 22] | 5 | The same composition as the left column |
| Diethylene glycol | 25 | |
| Diethylene glycol mono-ethylether | 20 | |
| N—methyl-2-pyrrolidone | 5 | |
| Distilled water | 45 | |
| Untreated | | Activated charcoal (20% by weight based on Direct Fast Black B) was mixed with the above ink composition under stirring and the activated charcoal filtered off, and the filtrate with supplement distilled water added corresponding to the yield of filtrate |

| Ink B-1 | | Ink B-2 |
|---|---|---|
| | | was thoroughly stirred. |

| Content of m-phenylenediamine | |
|---|---|
| 4200 ppm | 70 ppm |

| Ink C-1 | | Ink C-2 |
|---|---|---|
| Direct Deep Black EX (trade name of dye; produced by Mitsubishi Kasei Co.) [C.I.D.B. 38] | 4 | The same composition as the left column |
| Glycerine | 10 | |
| Diethylene glycol mono-ethylether | 30 | |
| Distilled water | 56 | |
| Untreated | | A solution of Direct Deep Black EX in distilled water was dialyzed with a dialyzing membrane (Spectrapore), and glycerine and diethylene glycol mono-ethylether were added to the residual aqueous water to be dissolved therein |

| Content of m-phenylenediamine | |
|---|---|
| 2400 ppm | 150 ppm |

| Ink D-1 | | Ink D-2 |
|---|---|---|
| Special Black G (trade name of dye; produced by Bayer Co.) [C.I.D.B. 19] | 9 | The same composition as the left column |
| Diethylene glycol | 34 | |
| Glycerine | 10 | |
| N—methyl-2-pyrrolidone | 12 | |
| Distilled water | 35 | |
| Untreated | | Activated charcoal (10% by weight based on Special Black G) was mixed with the above ink composition and stirred, followed by removal of activated charcoal by filtration, and the filtrate supplemented with distilled water corresponding to its yield was thoroughly stirred. |

| Content of m-phenylenediamine | |
|---|---|
| 5500 ppm | 300 ppm |

| Ink E-1 | | Ink E-2 |
|---|---|---|
| Daiwa Black #1000 (trade name of dye; produced by Daiwa Kasei Co.) [C.I.D.B. 154] | 2 | The same composition as the left column |
| Diethylene glycol | 30 | |
| Triethanolamine | 20 | |
| Distilled water | 48 | |
| Untreated | | The above ink composition was subjected to ultrafiltration through a diaphragm of Yumicron YUF-10,000 (YUASA Battery Co., Ltd.) and, with supplemental distilled water corresponding to the lost amount added to the concentrate, the mixture was sufficiently stirred. |

| Content of m-phenylenediamine | |
|---|---|
| 1400 ppm | 80 ppm |

| Ink F-1 | | Ink F-2 |
|---|---|---|
| Water Black #100 (trade name of dye; produced by Orient Kagaku Co.) [C.I.D.B. 19] | 2.5 | The same composition as the column |
| Diethanolamine | 25 | |
| Triethylene glycol mono-methylether | 20 | |
| Distilled water | 52.5 | |
| Untreated | | The above ink composition was subjected to ultrafiltration through a diaphragm of Yumicron YUF-10,000 (YUASA Battery Co., Ltd.) and, with supplemental distilled water corresponding to the lost amount added to concentrate, the mixture was sufficiently stirred. |

| Content of m-phenylenediamine | |
|---|---|
| 2200 ppm | 120 ppm |

| Ink G-1 | | Ink G-2 |
|---|---|---|
| Direct Paper Black B (trade name of dye; produced by Sumitomo Kagaku Co.) [C.I.D.B. 22] | 7 | The same composition as the left column |
| Polyethylene glycol | 33 | |
| N—methyl-2-Pyrrolidone | 17 | |
| Urea | 3 | |
| Distilled water | 40 | |
| Untreated | | The above ink composition (100 parts by weight) was stirred vigorously with ethyl acetate (6 parts by weight), and then left to stand, followed by separation of the resultant supernatant. |

| Content of m-phenylenediamine | |
|---|---|
| 4900 ppm | 40 ppm |

All of the above inks were subjected to filtration through a membrane filter of pore size of 1 μm before use. The contents of m-phenylenediamine in the above inks were measured by the following method.

TLC (thin liquid chromatography) method

After 1 μl each of the respective inks prepared was placed on a silica gel plate (produced by Merck, HPTLC), development was carried out with a developer comprising 8 parts of butanol, 3 parts of ethanol, 4 parts of pyridine, 4 parts of 28% aqueous ammonia, and 3 parts of water and quantitative measurements performed by means of a chromatoscanner, followed by determination of the m-phenylenediamine content using a calibration curve previously prepared.

In this case, when driving of the recording head was performed by inputting rectangular voltage signals of 10 μsec, 40 V at frequency of 200 μsec, the head was found to stand sufficiently the continuous ink discharging for 160 hours or longer when using any of the inks A-2, B-2, C-2, D-2, E-2, F-2 and G-2.

On the other hand, when A-1, B-1, C-1, D-1, E-1, F-1 and G-1 were employed for comparative purpose, the ink failed to be discharged before elapse 10 hours in any case.

Further, the following items were checked for the inks A-2, B-2, C-2, D-2, E-2, F-2 and G-2, to obtain good results for each of them.

Long term storageability; when an ink was sealed within a glass vessel at −30° C. and at 60° C. for 6 months, there was observed no precipitation of insolubles without any change in physical properties or tone of the ink.

Discharging stability; discharging was carried out for 24 hours in atmospheres of room temperature, 5° C., and 40° C., respectively. As the result, stable recording of high quality could be performed constantly under any of the conditions.

Discharging response: When examined about intermittent discharging at 2 seconds intervals and discharging after intermission for 2 months, no clogging was observed at the orifice tip in any of the case to enable stable and uniform recording.

Quality of ink dot: Ink dots driven against the paper were high in density and clear. The percentage in a decrease of the density after exposed to a room light for 3 months was less than 1%, and the ink blotted little when immersed into water for one minute.

COMPARATIVE EXAMPLE

Using inks A-1, B-1, C-1, D-1, E-1, F-1 and G-1, the same items as described above were examined. As the result, in any of the cases, insolubles were precipitated within one month during storage of the ink, and clogging frequently occurred in the recording head during discharging or at rest.

EXAMPLE 2

Each of the inks A-2, B-2, C-2, D-2, E-2, F-2 and G-2 prepared in Example 1 was individually filled in a felt pen and the pen was left to stand with its cap off for one week. Then, writing test was conducted for each pen to find that smooth writing was possible in every case.

What we claim is:

1. A heat-stable recording liquid comprising an aqueous liquid composition containing a sufficient amount of a water-soluble dye, synthesized from m-phenylenediamine, as recording agent to provide a desired image, characterized in that the content of m-phenylenediamine in said composition is 1000 ppm or less.

2. A recording liquid according to claim 1, wherein the content of m-phenylenediamine is 300 ppm or less.

3. A recording liquid according to claim 1, wherein the content of m-phenylenediamine is 100 ppm or less.

4. A recording liquid according to claim 1, wherein said water-soluble dye is at least one selected from the group consisting of C.I. Direct Black 19, C.I. Direct Black 22, C.I. Direct Black 38, and C.I. Direct Black 154.

5. A recording liquid according to claim 1, wherein said water-soluble dye is an amount of 1 to 10% by weight.

* * * * *